United States Patent [19]

Botha

[11] 4,346,842
[45] Aug. 31, 1982

[54] IRRIGATION DEVICE AND A METHOD OF OPERATING SUCH DEVICE

[76] Inventor: Theunis C. Botha, Stettyn, Worcester, Cape Province, South Africa

[21] Appl. No.: 209,203

[22] Filed: Nov. 21, 1980

Related U.S. Application Data

[63] Continuation-in-part of Ser. No. 10,933, Feb. 9, 1979, abandoned.

[30] Foreign Application Priority Data

Feb. 22, 1978 [ZA] South Africa .................... 78/1038

[51] Int. Cl.³ ................... B05B 3/18; A01G 25/09
[52] U.S. Cl. ............................ 239/183; 239/192; 239/199
[58] Field of Search ............. 239/183, 191, 192, 198, 239/199, 1

[56] References Cited

U.S. PATENT DOCUMENTS

| | | |
|---|---|---|
| 1,919,703 | 7/1933 | Nielsen . |
| 2,152,425 | 3/1939 | Wilson . |
| 2,218,964 | 10/1940 | Wilson . |
| 2,249,211 | 7/1941 | Johnson . |
| 2,540,556 | 2/1951 | Salatin . |
| 2,548,326 | 4/1951 | Sparks et al. . |
| 2,683,056 | 7/1954 | Hilfinger . |
| 2,788,242 | 4/1957 | Jepson . |
| 2,835,531 | 5/1958 | Egly . |
| 2,905,392 | 9/1959 | Keltner . |
| 2,985,380 | 5/1961 | Rosenkranz . |
| 3,081,038 | 3/1963 | Sparks et al. . |
| 3,091,397 | 5/1963 | Wynstra . |
| 3,126,156 | 3/1964 | Rinkewich ............... 129/192 X |
| 3,430,859 | 3/1969 | Hochow . |
| 3,478,964 | 11/1969 | Karmann . |
| 3,489,352 | 1/1970 | Diggs . |
| 3,507,336 | 4/1970 | Nelson . |
| 3,628,731 | 12/1971 | Phillips . |
| 3,687,372 | 8/1972 | Badcock . |
| 3,841,561 | 10/1974 | Lacy . |
| 3,972,478 | 8/1976 | Groelz . |
| 4,003,519 | 1/1977 | Kruse et al. . |
| 4,119,272 | 10/1978 | Tidwell ........................... 239/199 |

FOREIGN PATENT DOCUMENTS

2629790 12/1978 Fed. Rep. of Germany ...... 239/199
7805 of 1892 United Kingdom ................ 239/192

OTHER PUBLICATIONS

*AA Bock of the Car*, Drive Publications Ltd., Fanum House, Basingstoke, Hants, Great Britain, 1973, 2nd Edition, 2nd Revise, pp. 116–117.

*Primary Examiner*—Andres Kashnikow
*Attorney, Agent, or Firm*—Berman, Aisenberg & Platt

[57] ABSTRACT

A self-propelled irrigation device comprises a wheeled chassis (12) having a drive wheel (14.2), a rotary take-up reel (18) mounted on the chassis, a drive arrangement, and differential and change-speed gearing (26) for apportioning drive from the drive arrangement differentially between the take-up reel for taking up the hose and the drive wheel for propelling the irrigation device in the direction in which the hose extends away from the device, different drive transmission ratios being selectable.

9 Claims, 7 Drawing Figures

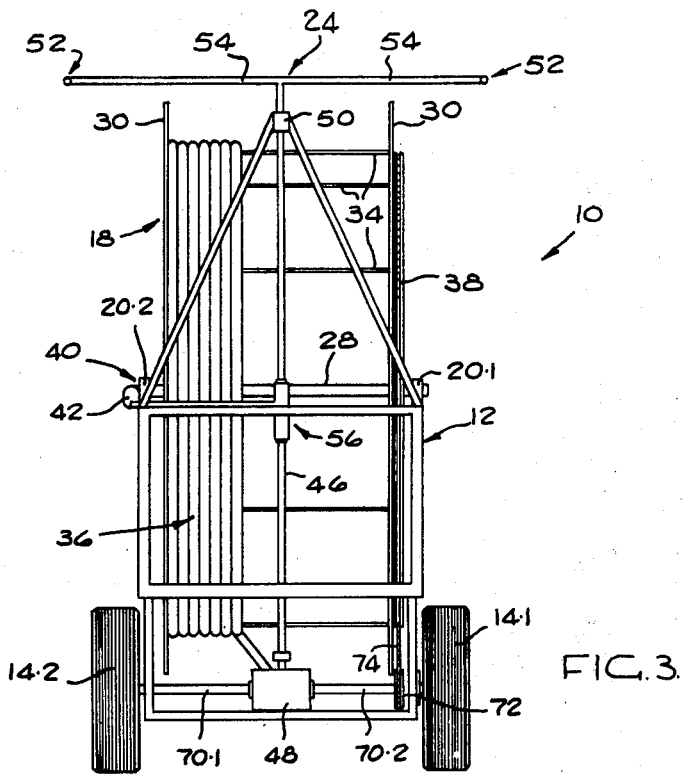
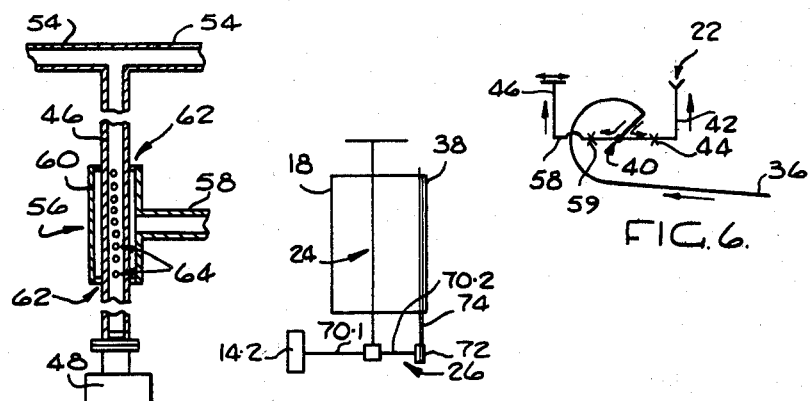
FIG. 3.
FIG. 4.
FIG. 5.
FIG. 6.

IRRIGATION DEVICE AND A METHOD OF OPERATING SUCH DEVICE

RELATED APPLICATION

This application is a continuation-in-part of Application Ser. No. 010,933 filed Feb. 9, 1979, and now abandoned.

BACKGROUND OF THE INVENTION

This invention relates to a self-propelled irrigation device and to a method of operating such a device. The invention finds particular application in the irrigation of crops and large expanses of lawn such as on golf courses.

SUMMARY OF THE INVENTION

According to the invention there is provided a self-propelled irrigation device which comprises:

a wheeled chassis having at least one drive wheel;

take-up means on the chassis for taking up a supply hose extending away from the device;

irrigation means on the chassis, connected or connectable in fluid flow communication with the supply hose;

drive means; and differential drive transmission means comprising an input shaft connected to the drive means, and differentially-driven first and second output shafts, the first output shaft being connected to the drive wheel and the second output shaft being connected to the take-up means, whereby, in operation, drive from the drive means is apportioned differentially between the take-up means for taking up the hose and the drive wheel for propelling the irrigation device in the direction in which the hose extends away from the device.

In other words, the first and second output shafts will be free to rotate independently of one another, provided there is a predetermined ratio between the sum of their individual rotational speeds and the rotational speed of the input shaft.

The drive transmission means may have a variable drive transmission ratio, that is, to change the predetermined ratio referred to above. Thereby the speed of propulsion of the device may be selected in accordance with the required irrigation intensity.

The drive transmission means may include differential and change-speed gearing connecting the input shaft to the first and second output shafts, for providing said differential drive apportionment and variable drive transmission ratio. The change-speed and differential gearing may together be housed in a gear housing. In this form, use may conveniently be made of a combination change-speed gearbox and differential gear train unit of a rear-engined rear wheel drive, or front-engined front wheel drive motor vehicle. Such units, being mass produced, are of conventional structure and are relatively inexpensive. An example of the nature of differential gearing and how it works, is to be found in 'AA Book of the Car', second edition, second revise, pages 116 and 117, edited and designed by Drive Publications Limited, Farum House, Basingstoke, Hants, Great Britain 1973.

The take-up means may be in the form of a reel rotatably mounted on the chassis, the reel having a conduit connected to the irrigation means via a rotatable fluid flow coupling coaxial with the reel, and the hose being connected or connectable in fluid flow communication with said conduit.

The drive means may conveniently be hydraulic drive means, for example a reaction rotor, connected or connectable in fluid flow communication with the hose, for operation by fluid under pressure flowing from the hose.

The chassis may be provided with a steerable wheel and a steering mechanism associated with the steerable wheel for steering the device, the steering mechanism being co-operable with that part of the hose extending, in use, away from the device in such a manner as to cause the device automatically to follow the lie or path of said part of the hose.

The invention extends to a method of operating a self-propelled irrigation device having take-up means for taking up a supply hose extending away from the device and a drive wheel for propelling the device, which method comprises apportioning drive through differential drive transmission means differentially between the take-up means for taking up the hose and the drive wheel for propelling the device in the direction in which the hose extends away from the device.

Where the device includes a steerable wheel, the method may include automatically steering the wheel in accordance with the lie or path of that part of the hose extending away from the device, thereby causing the device to follow the lie of the hose.

BRIEF DESCRIPTION OF THE DRAWINGS

The invention will now be described in more detail by way of example, with reference to the accompanying drawings.

In the drawings:

FIG. 3 is a rear end elevation of the device;

FIG. 4 shows a cross section on an larger scale of part of the device, taken on IV—IV in FIGS. 1 and 2;

FIG. 5 is a diagrammatic representation showing the drive mechanism of the device;

FIG. 6 is a diagrammatic representation showing the flow of water in the device.

DETAILED DESCRIPTION OF PREFERRED EMBODIMENT

Figure 1:
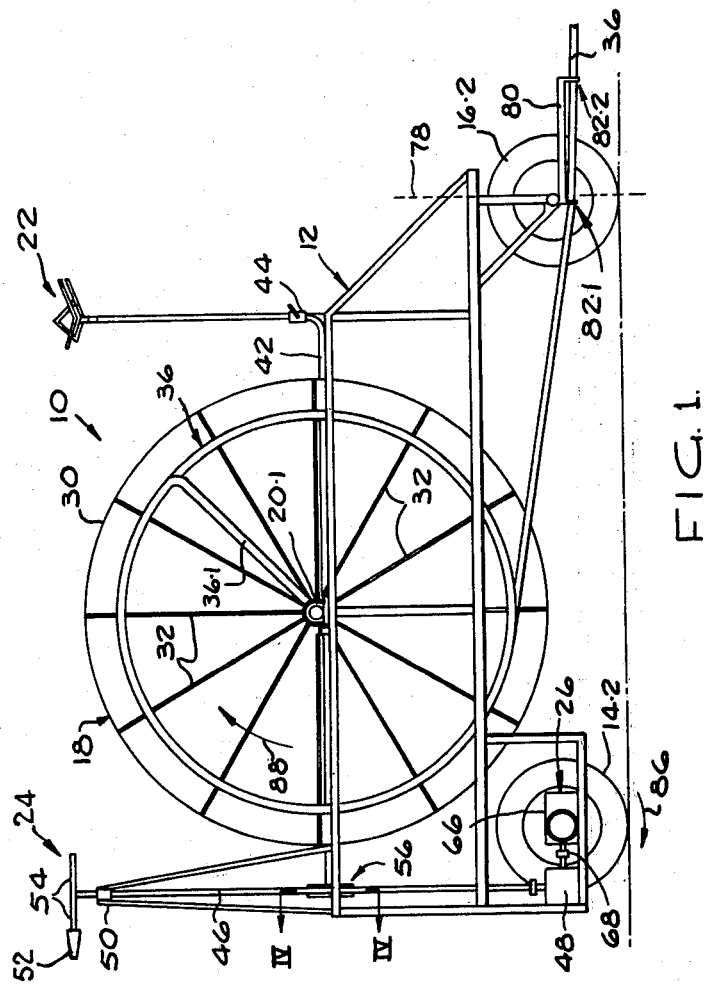
FIG. 1 is a side elevation of a self-propelled irrigation device in accordance with the invention, its right hand wheels having been removed for the sake of clarity.
Figure 2:
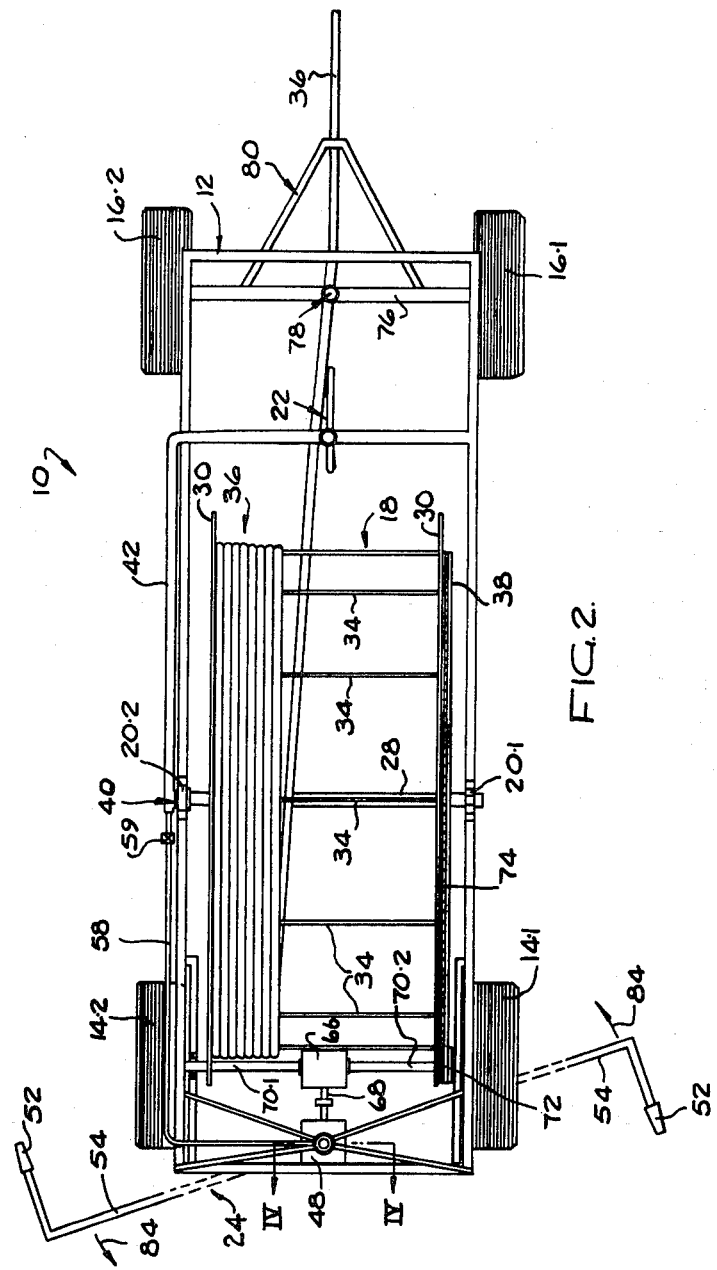
FIG. 2 is a plan view of the device.

In FIGS. 1 to 3, reference numeral 10 generally indicates an irrigation device comprising an open framework chassis 12 with two rear wheels 14.1 and 14.2, and two steerable front wheels 16.1 and 16.2. The irrigation device further comprises a reel 18 mounted for rotation on the chassis 12 in bearings 20.1 and 20.2; irrigation means in the form of a sprinkler 22 at the front of the device; drive means 24 at the rear of the device; and differential drive transmission means 26 connecting the drive means 24 to the reel 18 and to the left hand rear wheel 14.2. The rear wheel 14.2 is the only drive wheel of the device. The other wheels are all freely rotatable.

The reel 18 is of framework construction and has a hollow axle 28 forming a conduit, the axle being journalled in the bearings 20.1 and 20.2, two laterally spaced peripheral rings 30, a plurality of spokes 32 supporting the rings 30 on the axle 28, and a plurality of transversely extending rungs 34 arranged radially inwardly of the rings 30 and forming a support for a hose 36 rolled up on the reel. On the right hand side of the reel 18 there is mounted a large diameter sprocket 38.

One end of the hose, indicated by reference numeral 36.1, is connected in fluid flow communication with the hollow axle 28. The right hand end of the axle 28 is closed whereas the left hand end is connected via a rotary fluid flow coupling 40 to a main conduit 42. The rotary coupling 40 is co-axial with the reel 18. The main conduit 42 leads to the sprinkler 22 via a stop valve 44.

The drive means 24 comprises an upright hollow shaft 46 connected mechanically at its lower, closed end to the input shaft of a reduction gearbox 48, and journalled near its upper end in a bearing 50 on the chassis 12. The upper end of the shaft 46 is connected in fluid flow communication with a pair of opposed, tangentially directed nozzles 52 via a pair of hollow radius arms 54 (parts of which have been omitted in FIG. 2 for the sake of clarity). The hollow shaft 46 is connected in fluid flow communication with the main conduit 42 via a rotary fluid flow coupling 56 and a branch conduit 58. The branch conduit 58 is provided with a stop valve 59.

As will be seen in FIG. 4, the rotary coupling 56 comprises a casing 60 encircling the shaft 46 and having at each of its ends a rotary seal 62 sealing against the outside of the shaft. The interior of the casing is connected in fluid flow communication with the branch conduit 58, and the shaft 46 has a number of openings 64 intermediate the rotary seals 62, putting the interior of the shaft 46 into fluid flow communication with the interior of the casing 60.

The differential drive transmission means 26 comprises a combination change-speed gearbox and differential gear train housed in a gear housing 66 (not shown in FIG. 7) and having an input shaft 68 connected to the output shaft of the reduction gearbox 48, a first output shaft 70.1 and a second output shaft 70.2. The combination change-speed gearbox and differential gear train is conveniently that of a rear-engined rear wheel drive, or front-engined front wheel drive vehicle in which the shaft 68 is for connection to the vehicle's engine and the output shafts 70.1 and 70.2 for connection to its drive wheels, respectively.

Figure 7:
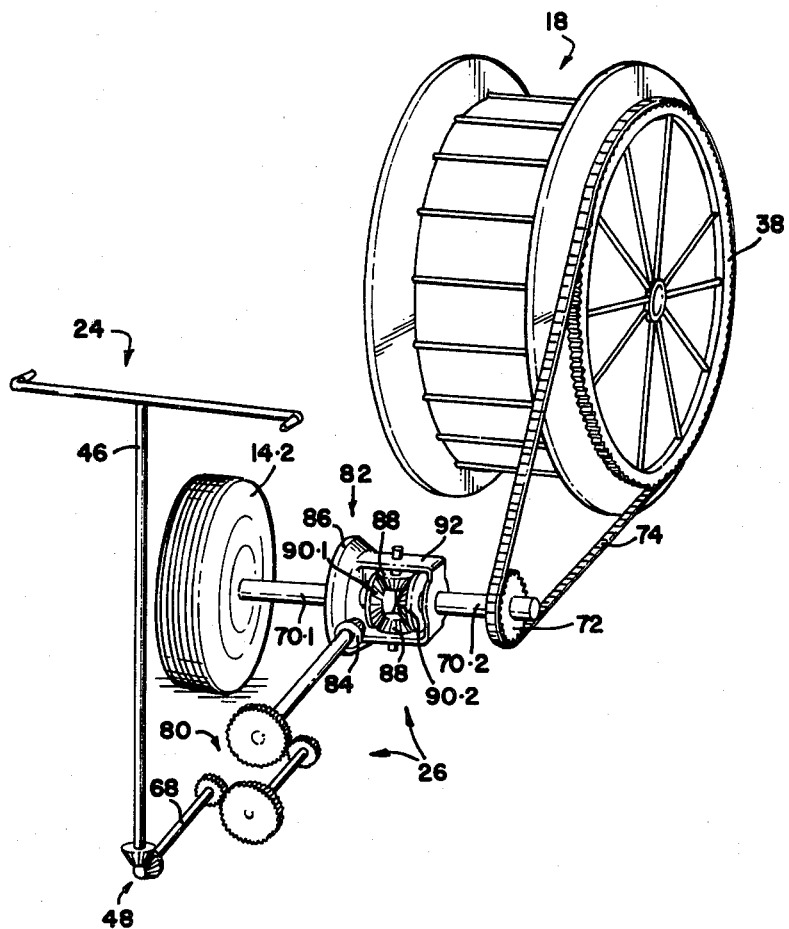
FIG. 7 is a perspective view showing the drive mechanism in more detail.

As will be seen in FIG. 7, the differential drive transmission means 26 comprises change speed gearing 80 and differential gearing 82. The change-speed gearing 80 will have means (not shown, but well known in the art) for changing the transmission ratio between the shaft 68 and the differential gearing 82. The differential gearing 82 comprises a pinion 84 and meshing crown wheel 86. It further comprises a pair of planetary bevel pinions 88 meshing with bevel gears 90.1 and 90.2. The planetary bevel pinions 88 are rotatably mounted on a cage 92 fast with the crown wheel 86. The pinion 84 is driven by the drive means 24 via the shaft 68 and the change speed gearing 80. The bevel gear 90.1 is connected to the output shaft 70.1 and the bevel gear 90.2 is connected to the output shaft 70.2. The crown wheel 86 and cage 92 are rotatable co-axially with and independently of the shafts 70.1 and 70.2.

The first output shaft 70.1 is connected directly to the drive wheel 14.2. The second output shaft 70.2 is connected via a small diameter sprocket 72 and a drive chain 74 to the large diameter sprocket 38 on the reel 18.

The structure of the differential gearing 82 is well known in the art and is shown, for example, in the 'Book of the Car' referred to earlier in this specification. The connection of the differential gearing 82 to the shaft 68, the wheel 14.2, and the reel 18 as shown in FIG. 7 is inherent in the original disclosure in my earlier application SN 10933 filed on Feb. 9th 1979.

The front wheels 16.1 and 16.2 are steerable by being mounted on a common front axle 76 which is pivotally mounted on the chassis 12 so as to be pivotable about a common vertical pivot axis 78. On the axis 76 there is mounted a forwardly extending arm 80 which has two longitudinally spaced openings 82.1 and 82.2 through which that part of the hose 36 which extends away from the device 10 passes.

OPERATION

In operation, the end of the hose 36 opposite the end 36.1 is connected to a supply of water under pressure. The change-speed gearbox is placed in neutral. This will allow the drive wheel 14.2 and the reel 18 to rotate freely and independently of one another. The device 10 is then drawn, e.g. by means of a tractor, to a point where irrigation is to commence, causing the hose 36 to unreel from the reel 18. The hose 36 is laid out along a path which the irrigation device is required to follow. The path may be straight or it may be curved. It may even be circular.

One of the gear ratios is then selected on the change-speed gearbox, the supply of water turned on, and the stop valves 44 and 59 opened.

The main stream of water will then flow via the hose 36, the rotary coupling 40, and the stop valve 44 to the sprinkler 22 for irrigation purposes. A relatively small portion of water will also flow via the hose 36, the rotatable coupling 40, and the stop valve 59 to the nozzles 52. The flow of water under pressure through the nozzles 52 will, by jet action, cause the shaft 46 to rotate in an anti-clockwise direction as indicated by arrows 84 in FIG. 2. This drive will then be transmitted through the reduction gearbox 48 and the change-speed gearbox and differential gear train combination in the gear housing 66 differentially to the drive wheel 14.2 and the reel 18. The drive will tend to rotate the drive wheel 14.2 in the direction of arrow 86, to cause the device 10 to move forwardly, and will tend to rotate the reel 18 in the direction of arrow 88 to cause the hose 36 to be taken up on the reel.

The operation of the differential drive transmission is such that, if the hose 36 is slack and thus presents little load on the reel, relatively more drive will automatically be apportioned to the reel than to the drive wheel, causing the hose to be taken up on the reel and thus increasing the tension in the hose. As the tension in the hose increases more drive will automatically be apportioned to the drive wheel 14.2, propelling the device 10 forwardly and hence tending to decrease the tension in the hose. Thus, the drive from the drive means will automatically be apportioned to the drive wheel 14.2 and the reel 18 such as to keep the ratio between tension in the hose and rolling resistance of the device 10 constant.

Engagement of the arm 80 with the hose 36 will cause the front wheel 16.1 and 16.2 to be steered in such a manner that the device will follow the path of the hose.

When the device 10 has reached the end of its path, the stop valves 44 and 59 are closed, the change-speed gearbox placed in neutral, and the device 10 drawn to a new starting point. The operation as described above will then be repeated.

The propelling speed of the device may be adjusted by selecting different gear ratios on the change-speed gearbox. If a motor vehicle gearbox is employed, four different gear ratios will normally be available.

It will be understood that, instead of the single sprinkler 22, a large number of sprinklers may be mounted on the device, e.g. in laterally spaced arrangement on a transversely extending boom.

What is claimed is:

1. A self-propelled irrigation device which comprises:
   a wheeled chassis having at least one drive wheel;
   take-up means on the chassis for taking up a supply hose extending away from the device;
   irrigation means on the chassis, connected or connectable in fluid flow communication with the supply hose;
   drive means; and
   differential drive transmission means comprising an input shaft connected to the drive means, and differentially-driven first and second output shafts, the first output shaft being connected to the drive wheel and the second output shaft being connected to the take-up means, whereby, in operation, drive from the drive means is apportioned differentially between the take-up means for taking up the hose and the drive wheel for propelling the irrigation device in the direction in which the hose extends away from the device.

2. An irrigation device as claimed in claim 1, wherein the drive transmission means has a variable drive transmission ratio.

3. An irrigation device as claimed in claim 2, wherein the differential drive transmission means includes differential and change-speed gearing connecting the input shaft to the first and second output shafts, for providing said differential drive apportionment and variable drive transmission ratio.

4. An irrigation device as claimed in claim 3, wherein the change-speed and differential gearing is together housed in a gear housing.

5. An irrigation device as claimed in claim 1, wherein the take-up means is in the form of a reel rotatably mounted on the chassis, the reel having a conduit connected to the irrigation means via a rotatable fluid flow coupling coaxial with the reel, and the hose being connected or connectable in fluid flow communication with said conduit.

6. An irrigation device as claimed in claim 1, wherein the drive means is hydraulic drive means connected or connectable in fluid flow communication with the hose, for operation by fluid under pressure flowing from the hose.

7. An irrigation device as claimed in claim 1, wherein the chassis is provided with a steerable wheel and a steering mechanism associated with the steerable wheel for steering the device, the steering mechanism being co-operable with that part of the hose extending, in use, away from the device in such a manner as to cause the device automatically to follow the lie of said part of the hose.

8. A method of operating a self-propelled irrigation device having take-up means for taking up a supply hose extending away from the device and a drive wheel for propelling the device, which method comprises apportioning drive through differential drive transmission means differentially between the take-up means for taking up the hose and the drive wheel for propelling the device in the direction in which the hose extends away from device.

9. A method as claimed in claim 8 wherein the irrigation device includes a steerable wheel, which method includes automatically steering the wheel in accordance with the lie of that part of the hose extending away from the device, thereby causing the device to follow the lie of the hose.

* * * * *